United States Patent [19]

Becker et al.

[11] Patent Number: 4,975,654
[45] Date of Patent: Dec. 4, 1990

[54] DATA SIGNAL DISCRIMINATION METHOD AND APPARATUS

[75] Inventors: Anthony J. Becker, Mountain View; Vincent Pluvinage, Menlo Park, both of Calif.

[73] Assignee: Resound Corporation, Redwood City, Calif.

[21] Appl. No.: 321,848

[22] Filed: Mar. 10, 1989

[51] Int. Cl.$^5$ .............................................. H03D 1/00
[52] U.S. Cl. .................................. 329/347; 329/349; 381/68
[58] Field of Search ...................... 329/347, 349, 353; 381/68, 150; 367/135, 178; 128/1.6, 362, 421; 455/296, 312, 337

[56] References Cited

U.S. PATENT DOCUMENTS 4,532,930 8/1985 Crosby et al. .................. 128/421 X Primary Examiner—Robert J. Pascal
Attorney, Agent, or Firm—McCubbrey, Bartels, Meyer and Ward

[57] ABSTRACT

A method and apparatus for discriminating the data signal of a transmitter means. Binary encoded data is transmitted between a transmitter means and a receiver means in an amplitude modulated signal varying about a threshold level. A means and method are included for determining the number of threshold crossings of the carrier during each of a number of discrete successive time intervals. A further method and means characterizes those of said time intervals wherein the number of threshold crossings equals or exceeds a first predetermined number as a mark, and those of said time intervals wherein the number of threshold crossings does not exceed said predetermined number as a null. The number of successive marks not separated by a predetermined number of nulls is then counted by a further aspect of the method and means. A series of successive marks in excess of a second predetermined number is then characterized as a one, and a series of successive marks in a range below said second predetermined number is characterized as a zero. The signal transmitted by said transmitter means is discriminated from interference by spurious signals.

42 Claims, 10 Drawing Sheets

FIG. 1
ULTRASONIC INPUT SIGNALS
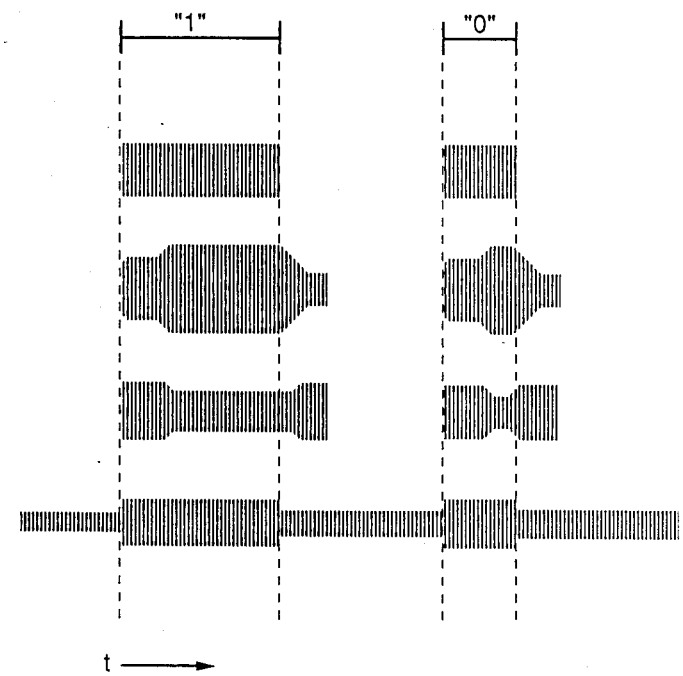
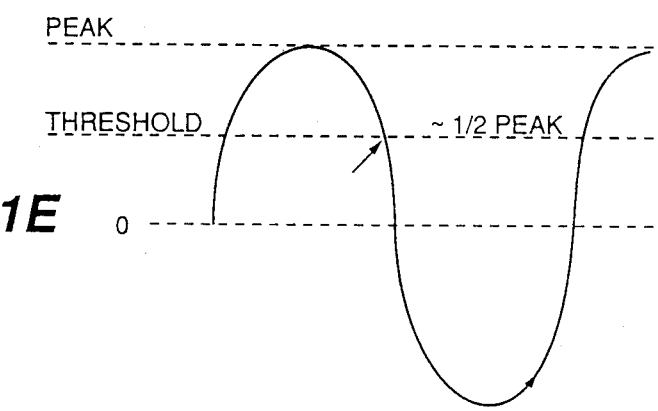
FIG. 1E

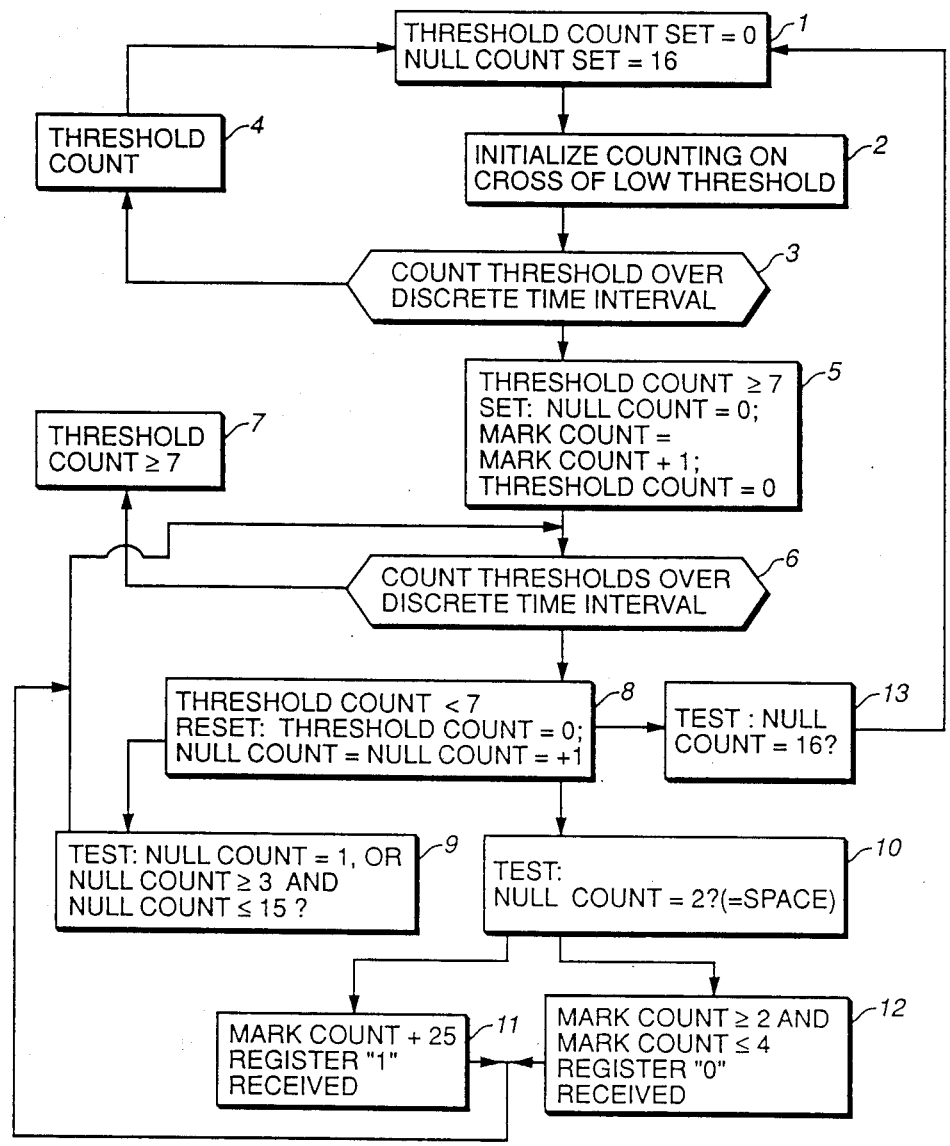
FIG._2

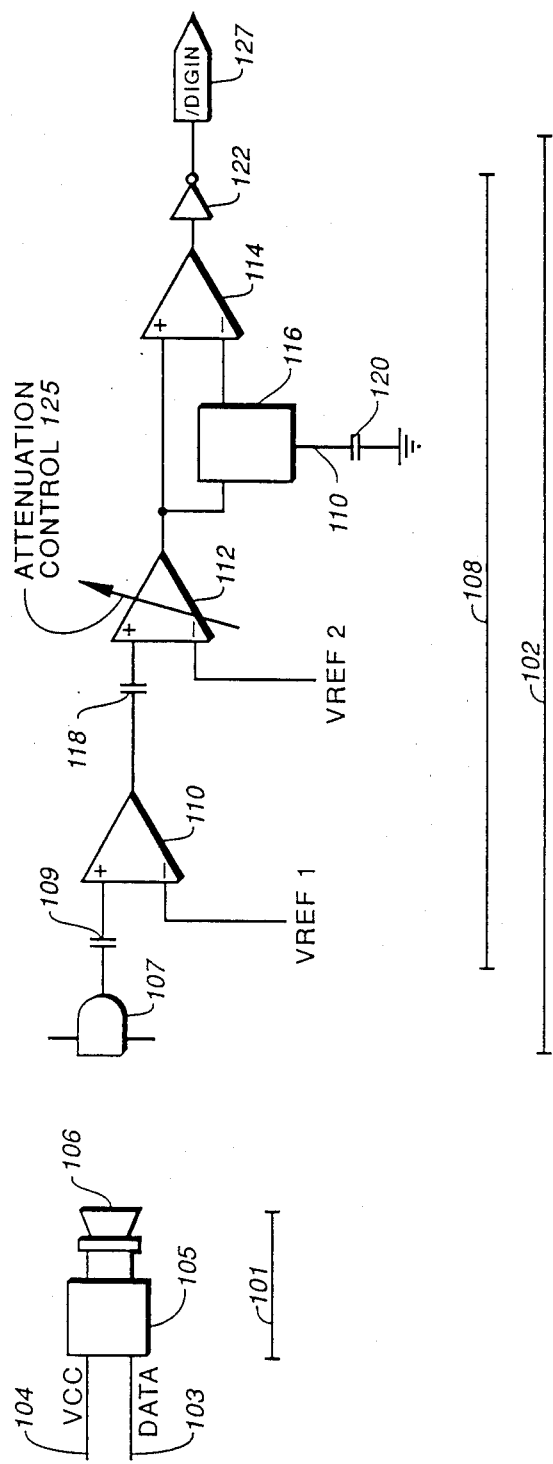
FIG._3A

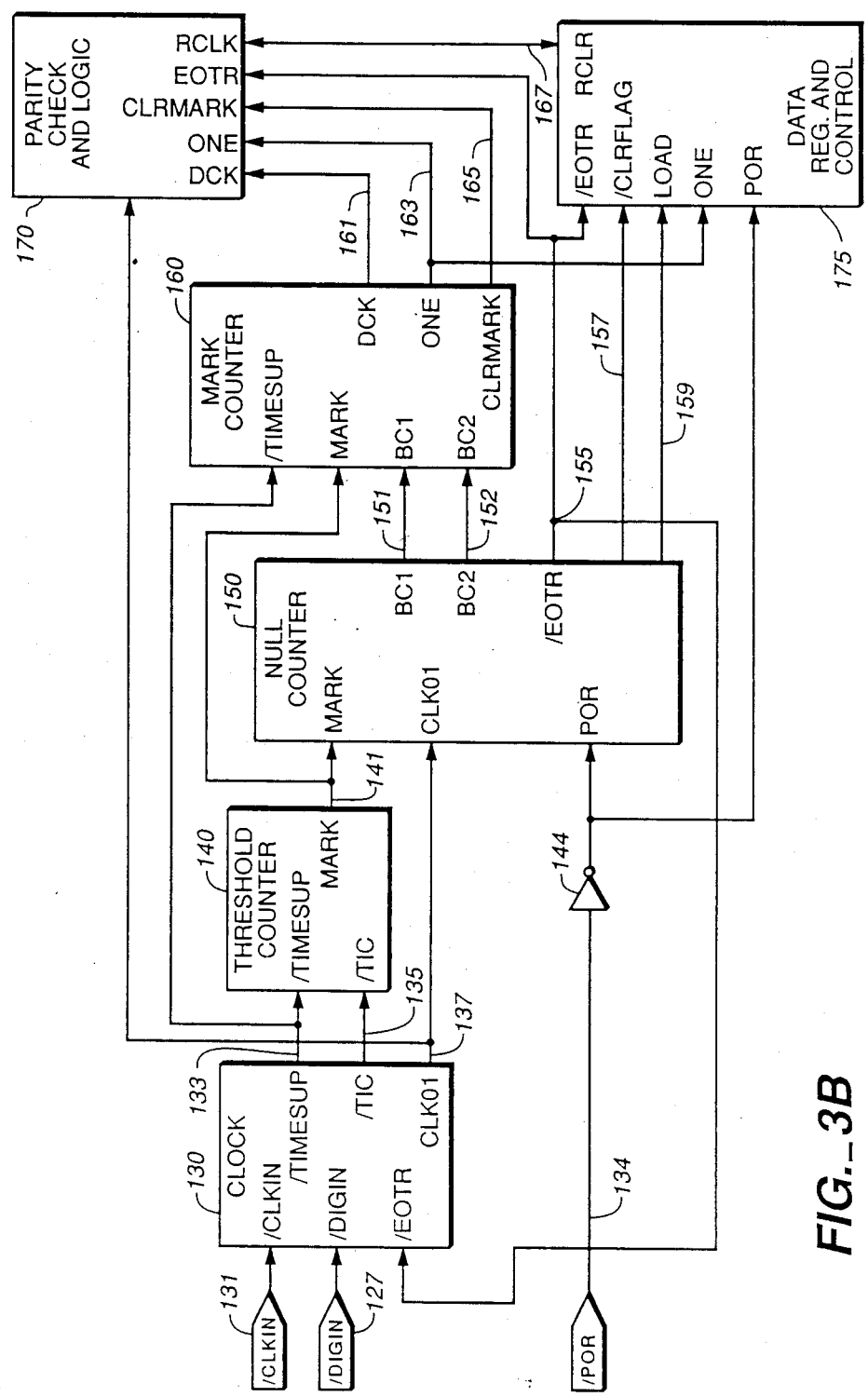
FIG._3B

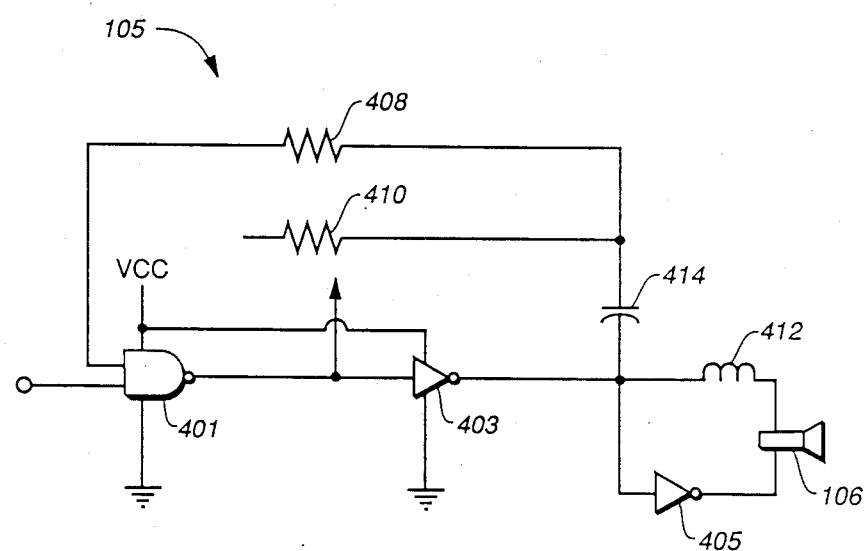
FIG._4

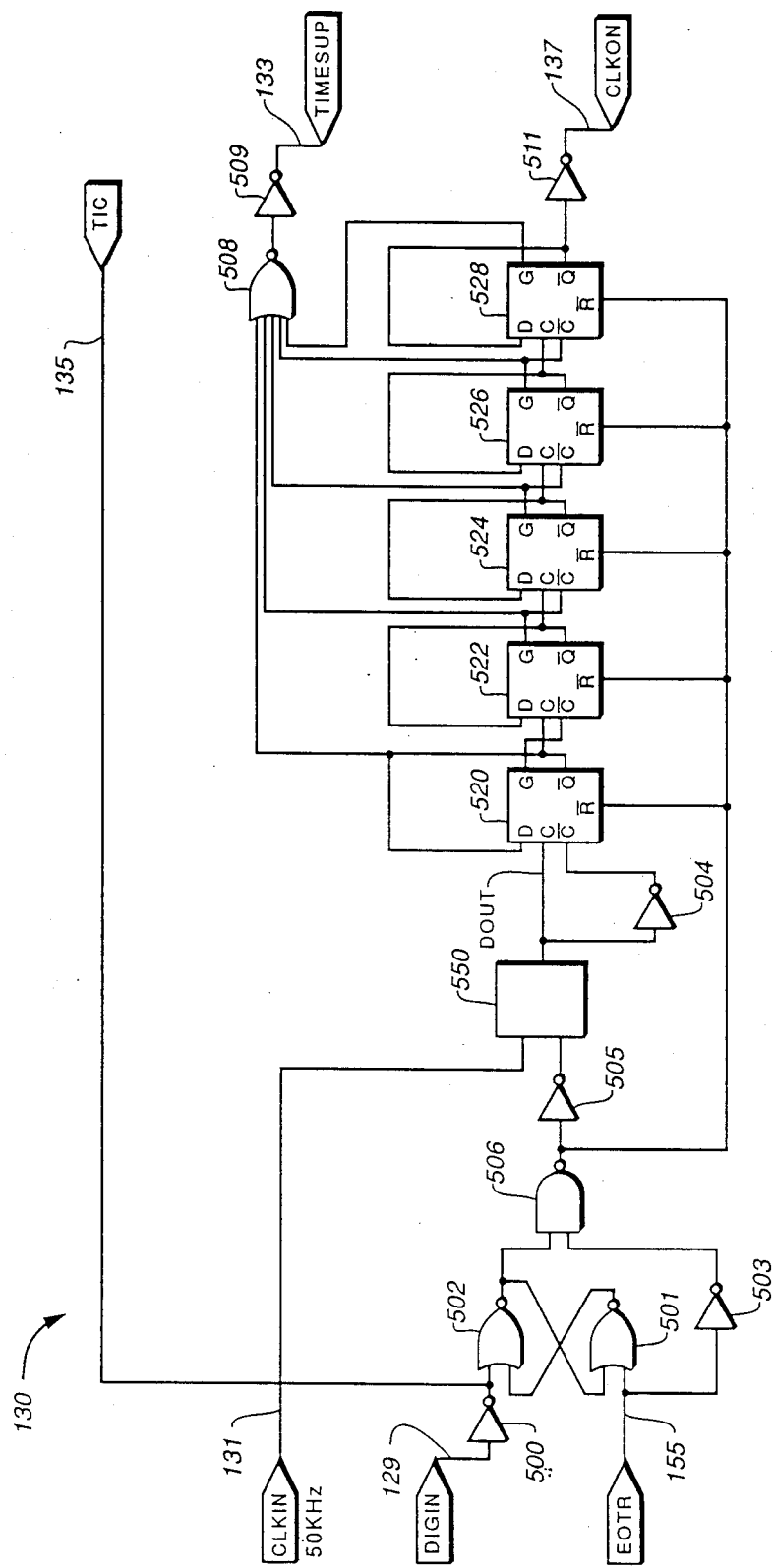
FIG._5A

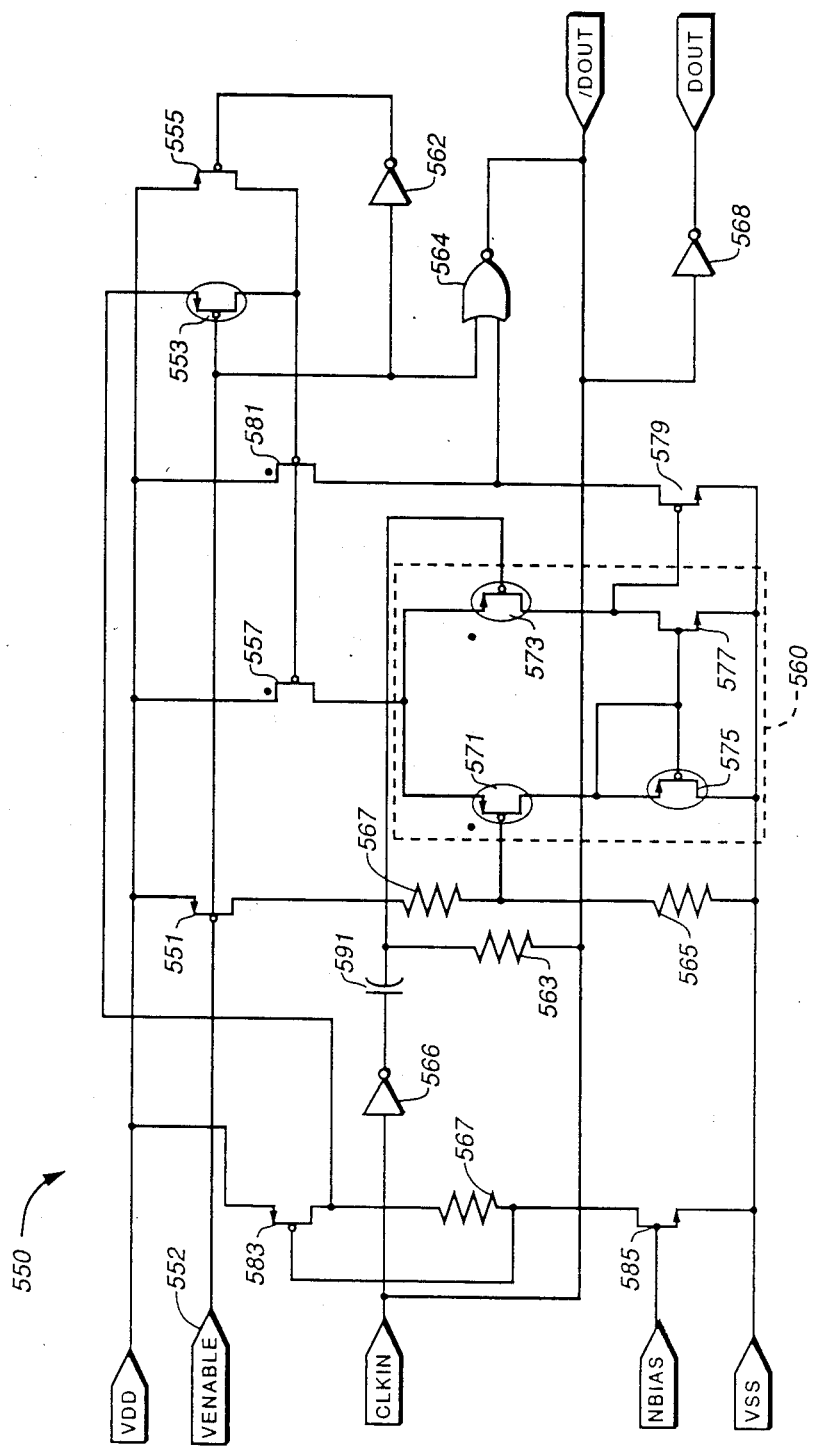
FIG._5B

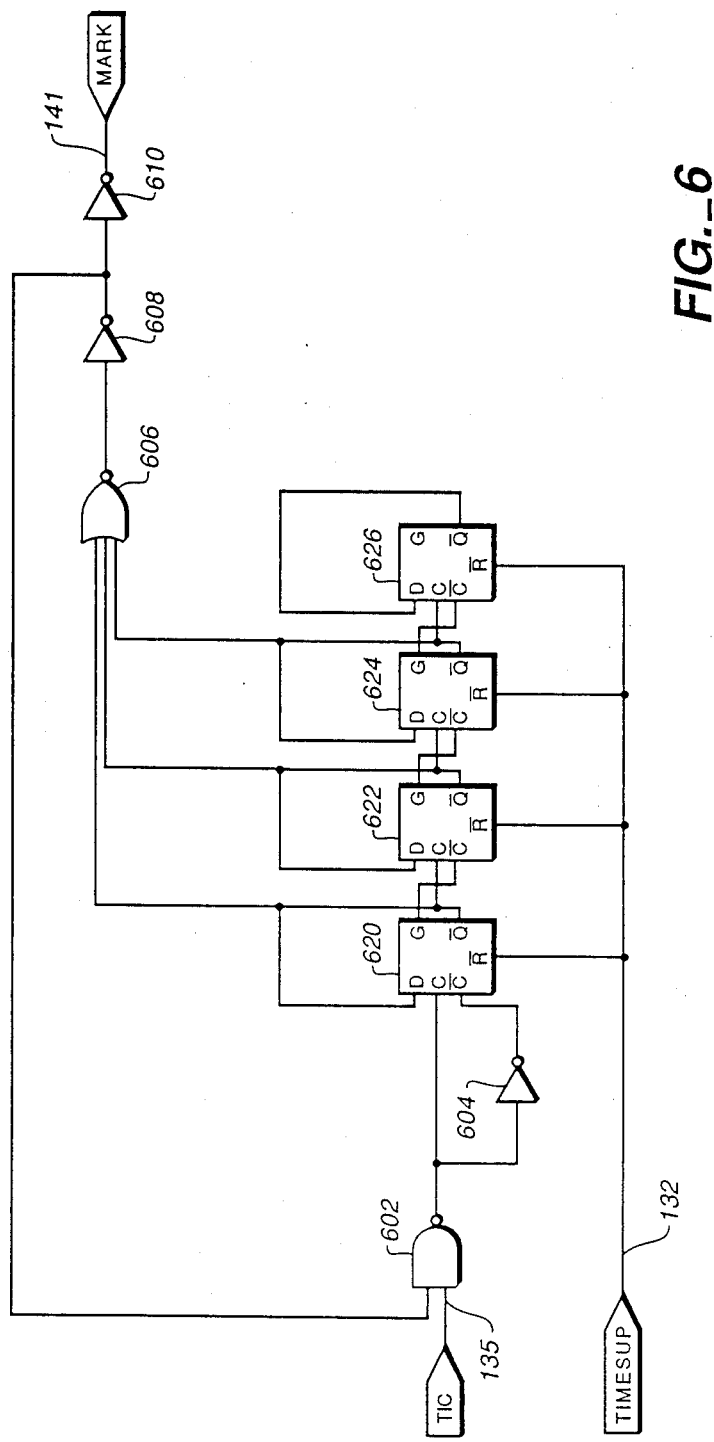
FIG._6

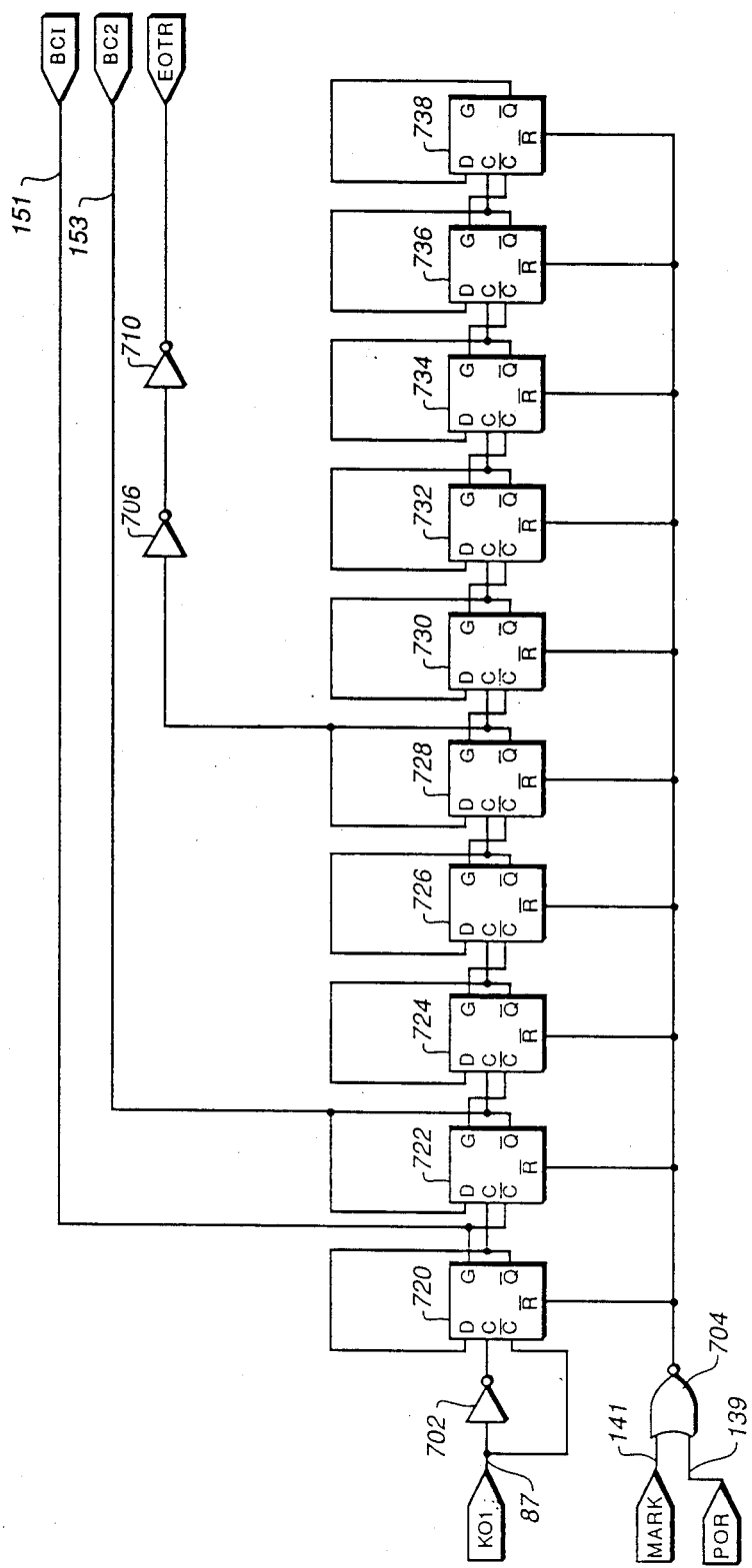
FIG._7

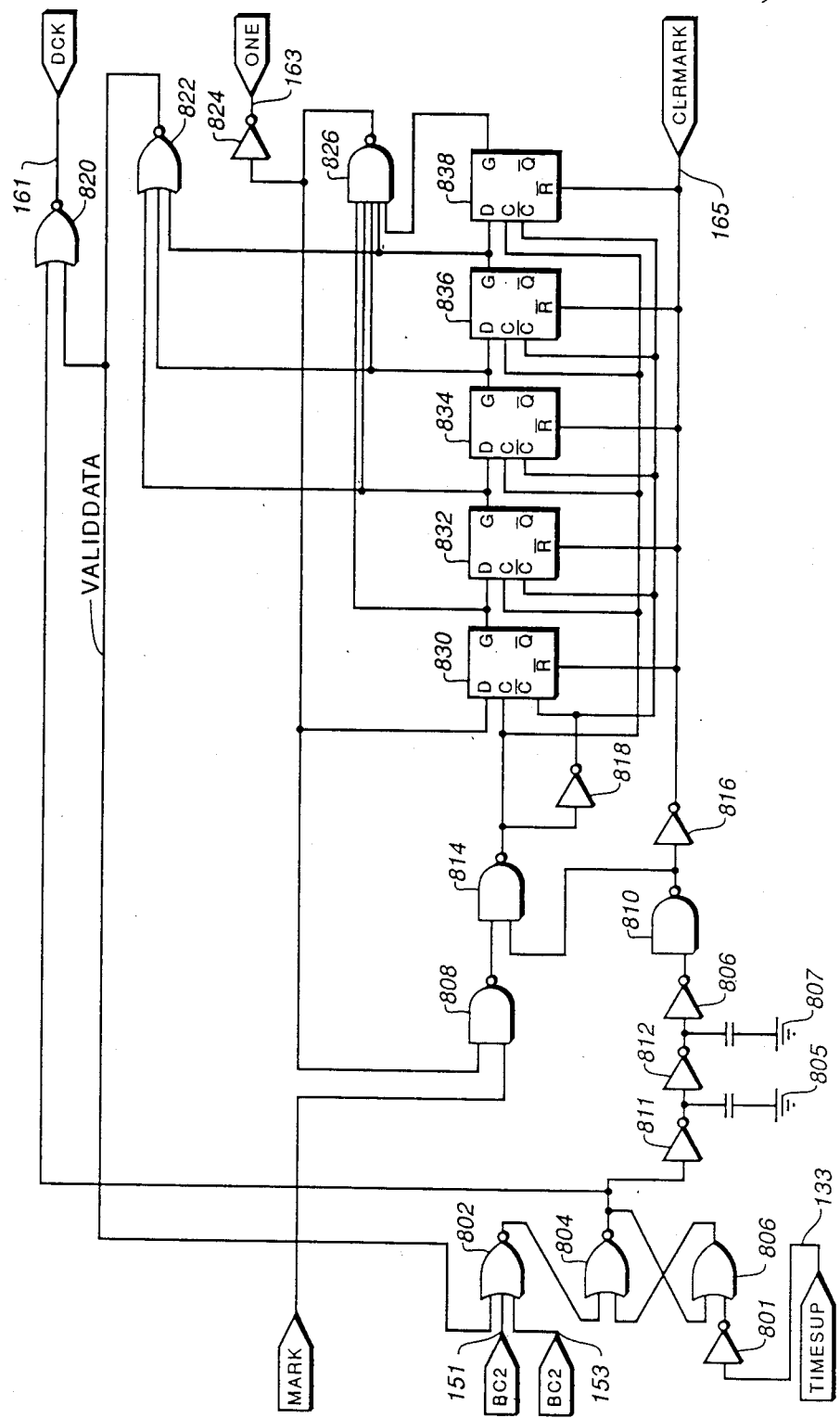
FIG._8

DATA SIGNAL DISCRIMINATION METHOD AND APPARATUS

BACKGROUND OF THE INVENTION

The invention relates to a method and apparatus for effecting error free transmission of digital data through a medium, such as air, between a transmitter and a receiver. The invention will be described herein with reference to its use in ultrasonic transmitter/receiver applications although those skilled in the art will recognize that its application is not so limited.

Ultrasonic signals transmitted between a transmitter and receiver travel many different paths. These different paths result from reflections of the signal from other sources in the medium. As a result the signal ultimately received by the receiver may be reinforced or canceled in certain portions depending on the phase relationship between the transmitted and reflected signal.

Ultrasonic transmitter/receiver systems have myriad applications. For example, systems are used as audiovisual remote controls, garage door openers, and security systems. Certain applications of such systems require data to be transmitted between the transmitter and receiver to accomplish programming tasks in apparatus connected to the receiver circuitry.

Many factors may contribute to such signal degradation. The main source of such degradation arises from reflection of the transmitted signal between the source and the receiver. Such reflections may result from any object in the transmission medium. Reflections of the signal result in the receipt of the same transmitted signal more than once sometimes referred to as echoes or path delays. The signal received is thus reinforced or canceled in certain areas and the integrity of the signal is, consequently, compromised.

Another source of signal degradation is the generation of spurious signals generated by other transmission apparatus such as those used in burglar alarms and automatic garage door openers, or merely from the jangling of a set of keys. These spurious signals result in the problems similar to those caused by reflections.

It is thus desirable to discriminate the data encoded in the transmitted signal from the degraded, received signal. The importance of such discrimination increases proportionately with the complexity of the data required in the particular application.

The preferred application of the method and apparatus of the invention is in a remote control hearing aid system. In such a system, the discrimination method makes it possible to program a hearing aid device, such as one used in-the-ear of the user, with a set of customized parameters particular to the user's own hearing problems to optimize the hearing enhancement characteristics of the device.

In the hearing aid art, systems are known in which the volume of the hearing device is adjustable in incremental steps from a remote control mechanism while the device is in the user's ear. The invention allows for a system wherein complex programming parameters may be transmitted to the receiver circuit to allow for the user to change the characteristics of the hearing aid between several different operational situations. For example, the aid itself can be programmed with a set of parameters to provide optimal performance for the user in situations where the user is in a noisy, crowded room. In addition, the aid can be programmed for situations where the user is in a quiet environment which requires discrimination of slight sounds. The invention allows such programming to occur from a remote control transmitter under the user's control within a wide range of distance and position from the hearing aid. The invention ensures that the data received by the device are only that data required to complete the programming.

The invention is useful in such a system in allowing programming codes to be transmitted between the remote control unit and the hearing device. It will be apparent to those skilled in the art that numerous possible applications for the system exist.

Thus, an object of the invention is to provide an improved method and apparatus for discriminating the data contained in a transmitted signal out of a corrupted received signal wherein the received signal may be corrupted by reflections and spurious signals.

A further object of the invention is to provide an improved method and apparatus to compensate for signal reflections and path length differences in the received signal.

A further object of the invention is to provide an improved method and apparatus to compensate for spurious signals which may be encountered and received by the receiver.

Other objects of the invention will become apparent to those skilled in the art from the following description and the accompanying drawings.

SUMMARY OF THE INVENTION

The invention comprises a method and apparatus for discriminating the data signal of a transmitter wherein binary encoded data is transmitted between the transmitter and a receiver. The data are transmitted by means of discrete timed pulses of an amplitude modulated signal in the form of an AC carrier varying about a threshold level. The number of threshold crossings of the carrier during each of a number of discrete successive time intervals is determined. Those of said time intervals wherein the number of threshold crossings equals or exceeds a first predetermined number are characterized as a mark; those of said time intervals wherein the number of threshold crossings does not exceed said predetermined number are characterized as a null. The number of successive marks is then counted, successive marks being those not separated by a null. A series of successive marks in excess of a second predetermined number is then characterized as a data input of "1". A series of successive marks in a certain range below said second predetermined number is characterized by the receiver as a "0". Through this series of steps, the transmitted signal is discriminated from interference with spurious signals.

DESCRIPTION OF THE DRAWINGS

FIG. 1 is a time/amplitude representation of the data signals transmitted in the system and representative noise and reflection signals picked up thereby, wherein:

FIG. 1A represents the signal transmissions as a "1" and "0" from the transmitter means and the signal which would be received by the receiver means in an ideally quiet situation.

FIG. 1B represents a first reflected signal which may be received by the receiving means.

FIG. 1C represents a second reflected signal which may be received by the receiving means.

FIG. 1D represents a signal received by said receiver means with associated noise.

FIG. 1E represents the negative going threshold crossing point of the signal.

FIG. 2 is a block diagram of the method steps of the system.

FIG. 3 is a block diagram of the preferred apparatus for implementing the method, wherein:

FIG. 3A is a block diagram of the transmitter and receiver means for implementing the preferred apparatus; and FIG. 3B is a block diagram of the preferred embodiment for counting threshold crossings, nulls, and marks and generating a data output therefrom.

FIG. 4 is a schematic diagram of the preferred embodiment of the transmitter driving circuit.

FIG. 5 is a schematic diagram of the clock divider apparatus used in the preferred embodiment of the invention.

FIG. 6 is a schematic diagram of the threshold counting apparatus used in the preferred embodiment of the invention.

FIG. 7 is a schematic diagram of the null counter apparatus used in the preferred embodiment of the invention.

FIG. 8 is a schematic diagram of the mark counting apparatus used in the preferred embodiment of the invention.

DETAILED DESCRIPTION OF THE INVENTION

FIGS. 1A-1D show time/amplitude representations of signals representing a "1" and a "0" in various received forms.

With reference to FIG. 1a, the transmitter means of the system transmits digital information in the form of rectangular pulses of a carrier wave for specific durations depending on whether the data to be transmitted is in the form of a "1" or a "0". FIG. 1A shows a time-amplitude representation of an ideal signal transmitted as a "1" and a "0".

Generally, the duration of the modulated signal for transmission of a "1" is more than twice that of the modulated signal for a "0". In the preferred embodiment of the system, the duration of modulation for a data output of "1" is 4 ms and for a "0" is 2 ms. Also in the preferred embodiment, the carrier signal used is a 25 khz signal resulting in the transmitted signal for a "1" being approximately 100 cycles of the carrier and the transmitted signal for a "0" being 50 cycles of the carrier.

It will be recognized by those skilled in the art that the operating frequency and data transmission time parameters can be varied without exceeding the scope of the invention. Those parameters described above have been found to be optimal for use in the preferred embodiment of the invention.

The transmitted signal received by a microphone in the receiver means is not the ideal signal sent by the transmitter and represented in FIG. 1A. The receiver microphone also perceives reflections of the transmitted signal and other spurious signals. Either of these undesired signals are sources which could interfere with the interpretation of the signal as a "1" or a "0".

Many possible sources of signal degradation arise in the hearing aid application of the invention. For example, reflections to the transmitted signal result from the height of the user's cheekbones, the shape of the user's pinna, the height of the user's shoulders, and the length of the user's hair.

An example of one such reflection is shown in FIG. 1B wherein the reflection is generally in phase with the transmitted signal resulting in an increase in signal amplitude and increase in the number of cycles of the signal received over time. Another example of reflected signal degradation is shown in FIG. 1C wherein the reflection is generally out of phase with the transmitted signal and a cancellation in the amplitude of the data signal occurs in the overlap period. Another example of interference to the signal can result from noise or other spurious signals as shown by example in FIG. 1D.

Referring now to FIG. 2, a flow chart of the logical steps of the discriminator system, the method of the invention is described with reference to the preferred embodiment of the invention.

In accordance with the inventive method, a receiver means waits in a quiescent state at step 1 whereby the count of thresholds is set at "0" and the null count is held at 16. A null count of 16 is used in the preferred embodiment to indicate to the receiver that an end of transmission state exists and no further data is forthcoming from the transmitter. As with the frequency and transmission time parameters, the quantity of nulls indicating the end of transmission state can be varied in accordance with the invention.

When a signal is detected by the receiver means at step 2, threshold counting begins for a period of one time interval at step 3. In the preferred embodiment, only those threshold crossings of the carrier signal moving from the positive rail to the negative rail, or those threshold crossings that are "negative going", are counted. An example of such a negative going threshold crossing is shown in FIG. 1E.

If the number of negative going threshold crossings does not reach seven during the first-time interval step 4, the receiver means returns to the waiting for transmission state at 1. If the count of threshold crossings does reach seven, indicating receipt of a mark, the null count is reset to 0, a count of one mark is recorded, and the threshold and null counts are reset to zero at step 5. Counting of the threshold crossings continues at step 6 over the discrete time intervals.

Counting of carrier thresholds takes place over a number of discrete time intervals, in step 6, for the duration of the signal. In the preferred embodiment, the discrete time intervals are 640 periods. Also in the preferred embodiment, a carrier signal at a frequency of 25 Khz is used, resulting in 16 cycles and 16 negative going threshold crossings of the carrier being received during each time interval.

In accordance with the method, if the number of negative going threshold crossings counted reaches seven within the discrete time interval at step 7, a mark is counted at 5. In addition, the threshold crossings count and the null count are reset to zero in step 5. Counting of marks continues in this manner through steps 5, 6, and 7 as long as the number of thresholds counted during each of the discrete time intervals reaches seven. The invention contemplates varying the number of thresholds used to define marks and nulls depending on the particular application in which the invention is used.

When a count of less than seven threshold crossings is attained during the specified time period at step 8, a null is counted. If the number of null counts is anything other than a first or second predetermined number tested at steps 9 and 10, counting of the threshold crossings over the discrete time periods continues returing to step 6. It should be noted that the occurrence of a single null or time period wherein the specific value of threshold crossings is not attained during the discrete time interval does not affect data interpretation in accordance with the method of the invention. The occurrence of such intermittent null counts between counts of marks may be caused by reflections and cancellations in the received signal, thus causing a count of less than the specified value of threshold crossings and a count of one null. In accordance with the objects of the invention, such degradation in the signal will not result in an incorrect interpretation by the receiving means.

If the count of nulls successive reaches two, a "space" is then characterized at 10. A space will trigger the release of a data output of "1" or "0" based on the number of marks counted tested at 11, 12. It should be emphasized that, in the preferred embodiment of the method, recording of a data input by reference to the number of marks counted is only implemented when the count of nulls equals two, i.e. when a "space" follows transmission of a "1" or a "0". If a space is received and the number of marks counted equals five or greater, the signal is interpreted as a data input of "1" at 11. If the number of marks counted equals or exceeds 3, but is less than or equal 4, the signal is interpreted as a data input of "0" at 12. In accordance with the invention, the parameters defining a "space" or any such trigger to release the data input may be varied.

As noted previously, if the null count reaches sixteen, the receiver is reset to the "waiting for transmission state" at step 13. A null count of sixteen is thus interpreted as an "End of Transmission" signal in the preferred embodiment.

By way of example and without limitation, the operation of the method in the preferred embodiment is hereinafter explained with reference to FIGS. 1A and 2.

If the transmission apparatus transmits a "1" and the signal is received in its ideal form, the signal would appear as shown in FIG. 1A representing a 100 cycle signal. The total transmission time of this data signal at 25 kHz is 4 ms. Approximately six discrete time units of 640 will occur during the transmission of this data signal. During each of these discrete time units, approximately 16 negative going threshold crossings of the carrier will occur and be counted until receipt of 7 such crossings at step 5. In transmission of a "1" where the signal is a pure 100 cycle, unreflected pulse, a total of 6 marks will be recorded before the first null is counted, (steps 5–7 FIG. 2). If the signal of FIG. 1A transmitted as a "1" is then followed by 2 consecutive nulls, the 6 consecutive marks will be recorded as a "1" at 11.

If the transmitter apparatus transmits a "0" and the signal is received in its ideal form, the received signal would appear as shown in FIG. 1A representing a 50 cycle signal. The total transmission time of this data signal at 25 kHz is 2 ms. Approximately 3 discrete time units of 640 μs will occur during the transmission of this data signal. With reference to the discussion above with respect to the transmission of a "1", the 7 negative going threshold crossings in each time unit will be counted as marks resulting in a 3 mark count, (steps 5–7 FIG. 2). If the signal of FIG. 1A transmitted as a "0" is then followed by 2 consecutive nulls at step 10, the 3 consecutive marks will be recorded as a "0" at step 12.

By way of example and without limitation, the operation of method in the preferred embodiment is hereinafter explained with reference to the FIG. 2 and the reflected signal in FIG. 1B.

The method of the system is substantially the same as that described with reference to FIG. 1A and an ideal signal, with the exception that a signal reflection has caused the received data signal to be lengthened by an undetermined amount and the signal amplitude of the transmitted signal has increased in the area of refractive reinforcement.

In the situation depicted by a received signal in the form of FIG. 1B, if the transmitted signal is a "1" the mark count will exceed the count 5 by some undetermined amount. This is acceptable since a data input of "1" is registered only when the marks are followed by two nulls at step 10. Further, there is no maximum number of marks which may constitute a "1" as long as the mark count exceeds 5.

If the transmitted signal is a "0" as shown in FIG. 1B, the mark count may be extended by the reflection resulting in the number of threshold crossings counted exceeding the number three marks (e.g. the number of marks recorded for an ideal "0" transmission). For this reason, the number of marks counted for which a "0" will be registered may equal up to four in the preferred embodiment. Again, the method only registers a "0" data input when 2 consecutive nulls are received after the signal at step 10. The reinforcement to the signal amplitude will have no effect on the interpretation of the signal received as is described with reference to FIG. 2 and FIG. 1D.

By way of example and without limitation, the operation of method in the preferred embodiment is hereinafter explained with reference to the FIG. 2 and the reflected signal described in FIG. 1C. The operation of the method on the signal distorted as shown in FIG. 1C is the same as that described with reference to FIG. 1A and, with the exception that a signal reflection has caused a cancellation in the signal amplitude and an increase in length in the received signal.

In the preferred embodiment of the receiving apparatus, the receiver circuitry automatically sets a threshold level of signal amplitude for operation on the received signal. A block diagram of the signal classifier system used to set this threshold level is shown in FIG. 3A. Thus, a cancellation of the signal amplitude still above this certain threshold level will not be acted on by the signal classifier. A slightly greater cancellation, below this certain threshold level, results in the discriminator system counting several series of marks, with an intermittent null interspersed between the mark counts.

As noted above with respect to the description of the method in FIG. 2, a count of nulls equaling 1 is disregarded by the discriminator. The next mark counted resets the null count to zero. As described above with reference to FIG. 2, only where a series of marks is followed by at least two nulls will the system record a data input based on the number of marks counted at step 10. Thus the interpretation of the signal shown in FIG. 1C by the discrimination system will result only in an additional count of one null being recorded at step 8 and discarded with the next mark count steps 6, 7, and 5 before the required number of marks is recorded to operate the data recovery circuitry.

It has been determined experimentally that the signal degradations encountered in the preferred embodiment will not alter the received signal interpretation beyond that described above. That is, with respect to the signal of FIG. 1C, cancellations in the signal amplitude encountered in the hearing aid application will not result in more than one null being encountered. The degradations will thus not vary the mark count by greater than + or −1 for a 0. It will be recognized by those skilled in the art that the parameters for characterizing marks, nulls and spaces may be changed in accordance with the method to compensate for greater reinforcements or cancellations in the received signal based on different applications.

FIG. 3 shows a block diagram of the preferred embodiment for implementing the method. FIG. 3A shows a transmitter 101 and a receiver 102 for implementing the method of the invention. The transmitter 101 includes data input 103 and voltage input 104 connected to an oscillator 105 for outputting a pulse signal to the transducer 106. In operation, a signal at data input 103 causes oscillator 105 to generate, a signal on transducer 106. The transducer 106 generates a signal output of "0" or "1" as described above with reference to FIG. 1A.

The receiver apparatus 102 is comprised of microphone 107, signal classifier 108 (FIG. 3A) and, clock 130, threshold counter 140, null counter 150, and mark counter 160 (FIG. 3B).

Signal classifier 108 is connected to the output signal of microphone 107 through capacitor 109 and is composed of an amplification means 110, attenuation means 112 comparator means 114 and detector means 116. The output of signal classifier 108, DIGIN 127, is connected to clock 130.

The signal classifier 108 is hereinafter described with reference to FIG. 3A.

The microphone output signal is coupled to one input of the preamplifier 110 by capacitor 109. The second input of preamplifier 110 is coupled to reference voltage VREF. The amplifier output signal is connected to the input of capacitor 118. The output of capacitor 118 is connected to one input of attenuation amplifier 112. The second input of attenuation amplifier 112 is coupled to a second reference voltage VREF2. The attenuator is controlled by digital input attenuation control signal 125 from the data registers used in the preferred application of the circuit. The output signal of the attenuation amplifier 112 is connected to one input of comparator 114. The output of the attenuation amplifier also is connected to detector 116. Detector 116 is connected to timing capacitor 120 via the USDET signal on conductor 119. The output of timing capacitor 120 is connected to ground. The output of the detector 116 is connected to the other input of comparator 114.

In operation, the signal classifier 108 operates to amplify the received signal and characterize the negative threshold crossing points of the received signal input into a square wave output for counting by the counting logic shown in FIG. 3B. The microphone 107 output is amplified by the preamplifier 110 and amplified again in the attenuation amplifier 112. A two signal digital input attenuation control 125 to attenuator 112 controls the amount of attenuation in 6 db steps over a range of 18 db. The output of attenuator 112 signal is then input to the comparator 119. The output signal attenuator 112 is also input to detector 116. Detector 116 sums the amplified input signal with a voltage of one-half the peak amplitude of the received signal stored on capacitor 120 and a 0.125 mV minimum threshold signal, used in the preferred embodiment, thereby forming the second input to the comparator 114. The comparator 114 thus operates to eliminate signals below 0.125 mV, all positive signals and higher level signals whose net negative amplitudes are greater than one half the signal amplitude minus 0.125 mV. The output signal of the comparator 114, is then output via an inverter 122 to form the DIGIN 127 signal input to the discriminator logic shown in FIG. 3B. The DIGIN output is thus a 25 hz square wave when the signal amplitude is above the threshold level and nothing when the signal is below the threshold signal level. The positive thresholds of DIGIN 127 represent the negative going threshold crossings of the carrier signal. The rest of the preferred embodiment thus uses only negative signals for simplicity of hardware operation.

By way of example, and with reference to FIG. 1D and the above description of FIG. 3A, compensation by the discriminator system for input signal accompanied by noise as shown in FIG. 1D is thus accomplished by the signal classifier 108. An input signal wherein noise is encountered will be eliminated by the signal classifier 108 where the noise level is below the threshold set at one-half the signal amplitude as described above by outputting a DIGIN signal output when the microphone 107 output signal is above a minimum threshold level. Calibration of the threshold level to a different value than that utilized in the preferred embodiment is contemplated by the invention. In the preferred embodiment, it has been determined that a threshold level set at one-half the signal amplitude is sufficient for most noise encountered in hearing aid applications.

FIG. 3B is a block diagram of the preferred embodiment for counting threshold crossings, nulls, and marks and generating a data output therefrom.

With reference now to FIG. 3B, the counting circuits of the device are hereinafter described. The output signal of the comparator 114, DIGIN 127 is input to clock 130. Also connected as clock 130 inputs are the CLKIN signal 131, and the EOTR signal 155. The clock 130 generates and outputs three signals; TIMESUP 133, TIC 135 and CLK01 137. The TIMESUP signal 133 is input to the threshold counter 140 and to mark counter 160. The TIC signal 135 is input to threshold counter 140. The CLK01 signal 137 is input to the null counter 150 and a bit parity checking device 170, both utilized in the preferred application of the device.

The threshold counter 140 generates MARK signal 141 which is output to null counter 150 and mark counter 160.

The MARK signal 141 and CLK01 signal 137 are input to null counter 150 as described above. In addition, the POR signal 139 is input via inverter 144 to the null counter 150 and data registers 175. The POR signal 139 originates with the power source of the receiving apparatus and a signal is output on the line whenever the power source used in the preferred embodiment is changed. In the preferred application this occurs when new batteries are installed in the receiver unit.

The null counter 150 generates the BC1 151 and BC2 153 signals which are in turn connected to mark counter 160. Signal BC1 151 is also connected to a beep apparatus utilized in the preferred application of the invention. Null counter 150 also generates the EOTR signal 155, the CLRFLAG signal 157 and the LOAD signal 159. The EOTR signal 155 is connected to the clock, as noted above, and to the parity check device 170 used in the preferred application of the apparatus. The CLRFLAG signal 157 and the LOAD signal 159 are connected to one of the data registers 175 used in the preferred application of the invention.

The TIMESUP signal 133, MARK signal 141, BC1 signal 151 and BC2 signal 153 are input to mark counter 160. Mark counter 160 generates the DCK signal 161, ONE signal 163, and CLRMARK signal 165 The DCK signal 161 is connected to the parity check device 170 used in the preferred application of the apparatus. The ONE signal 163 is connected to both the parity check device 170 and the data registers 175. The CLRMARK signal 165 is connected to the parity check device 170.

Operation of the counting devices used in the receiver apparatus disclosed in FIG. 3B is hereinafter described with reference to FIG. 3B and the above description.

The CLKIN signal 131 represents the 50 khz signal from an oscillating means (not shown) in clock 130. The clock 130 is also comprised of logic gates (not shown) including a 5 bit counter comprised of D-type edge triggered flip-flops. The CLKIN signal 131 period of 20 $\mu$s is multiplied in clock 130 by $2^5$ to 640 $\mu$s for use in generating output signals TIMESUP 133 and CLK01 137.

The EOTR signal 155 is a system reset signal (described above with reference to FIG. 2) which resets clock 130 and the data registers 175 used in the preferred application. The EOTR signal 155 outputs on account of 16 in null counter 100, indicating that the transmission has ended.

The DIGIN signal 127 begins the clock operation. The clock 130 will generate the TIMESUP signal 133 and CLK01 signal 137 once every 640 $\mu$s period. The CLK01 signal 137 thereafter triggers count of the null counter if the null counter is not reset by the MARK signal 141 from the threshold counter 140. The TIC signal 135 is equivalent to the DIGIN signal 127 at the input.

The threshold counter 140 composed of a number of logic gates (not shown) including a 4 bit counter composed of D-type edge triggered flip-flops. The threshold counter 140 proceeds to count the number of positive thresholds on each input of the TIC signal 135 during the 640 $\mu$s time period. (If the number of counts in the counter reaches 7 before the end of the 640 $\mu$s time interval, input to the counter is disabled and the signal generated. The TIMESUP signal 133 resets the threshold counter 140 to zero.)

If the count of thresholds has not reached 7 by the end of the 640 $\mu$s period, the null counter will register a count of one null on the clock input of the counter. If the MARK signal 141 is received, the null counter is reset to zero and is disabled for the duration, if any, of the 640 $\mu$s time period.

Signals BC1 151 and BC2 153 are generated by the Q output of the first D flip-flop and /Q output the second D flip-flop, respectively used in the null counter. When a count of 2 nulls is registered in the null counter, the outputs of BC1 151 and BC1 153 release the mark count in the mark counter 160 for output on the ONE signal 163 and DCK signal 161.

The null Counter 150 may also be reset to zero by the POR signal 139 input through inverter 144. The POR signal 139 is a system wide reset signal generated when new batteries are put into the hearing device as discussed above.

The MARK signal 141 generated by threshold counter 140 is also input to mark counter 160 which registers a count on each MARK output. If at any point the number of counts in the mark counter 160 reaches 5, the number required to discriminate a "1" in the preferred embodiment, the input to mark counter 160 is disabled and no further marks are counted. Further, the ONE signal 163 is then outputted to the data register 175.

The BC1 151 and BC2 153 inputs from null counter 150 indicate a count of two consecutive nulls to mark counter 160. The BC1 151 and BC2 153 signal release the mark count of the mark counter 160 once a valid space is detected between the data signals. The BC1 151 and BC2 153 signals are also used by the mark counter 160 to generate the DCK signal 161. The DCK signal 161 is used in the preferred embodiment to confirm the receipt of valid data by the discriminator circuit. The BC1 151 and BC1 153 signals are also used in conjunction with the TIMESUP signal 133 to generate the CLRMARK signal 165 which is used to reset the mark counter 160. The DCK 161 and CLRMARK signals 165 are used in the preferred embodiment to check the parity of the incoming data in the parity check device 170 and to generate the RCLK signal, coupled to data registers 175 and parity check 170. A count of five in the mark counter 160 generates the ONE signal 163 to the data registers 175 indicating discrimination of a "1". In the data registers, the input of a "1" will be recorded with the input of the ONE signal 163 and the RCLK signal 167 indicating a confirmation of the validity of the data received.

FIG. 4 is a schematic diagram of the preferred embodiment of the transmitter circuit. Data input 103 is connected to one input of a two input NAND gate 401. The driving voltage VCC of the logic gates 401 and 403 operates in a range from 3.3 to 5.1 volts. The second input of NAND gate 401 is a function of the output of the oscillator circuit 105. The output of NAND gate 401 is commonly coupled to the input of inverter 403 and variable resistor 410. Variable resistor 410 is coupled to resistor 408. The output of inverter 403 is connected through inductor 412 to one input of the ultrasonic transmitter 106. The output of inverter 403 is also input to capacitor 414. The output of capacitor 414 is input to resistor 408. The output of inverter 403 is also connected through inverter 405 to the second input of ultrasonic transmitter 106. The output of resistor 408 is connected to one input of the two input NAND gate 401 as discussed above.

Operation of the oscillator circuit is hereinafter described with reference to the above description. On an application of a data signal to NAND gate 401, the oscillator circuit 105 begins to oscillate by providing varying output on the second input of the NAND gate 401. The preferred embodiment of the transmitter circuit uses unbuffered inverters which provide a low quiescent current and a high output current which is required to drive the transformed transducer impedance. Application of the data signal 103 to NAND gate 401 causes an oscillating input to the second input of NAND gate 401 generated by inverter 403, inductor 412, and inverter 405. When the data input signal ceases, the circuit reduces to a path following inverter 403, inverter 405, inductor 412, capacitor 414 and variable resistor 410. In the preferred embodiment the value of resistor 410 is carefully adjusted to minimize the time required for decay of mechanical oscillations in the transducer. The transducer utilized in the preferred embodiment is a conventional ceramic bimorph transducer.

By inducing the data signal into NAND 401, the rise and fall times of the transducer output is substantially shortened over conventional transmitter applications. The use of unbuffered logic gates for NAND 550 and inverters 403 and 405 in the preferred embodiment of the transmitter circuit provides an additional significant advantage in maintaining circuit operating efficiency while the stiffness and effective mass of the transducer changes over a wide range of operating conditions. By connecting the load directly to the oscillator circuit, and utilizing the slow switching time characteristic of unbuffered logic gates, the natural resonant frequency of the piezoelectric transducer causes it to vary the amount of charge onto the timing capacitor 414 depending on whether the oscillator is running slightly faster or slightly slower than its resonant frequency.

FIG. 5A is a schematic diagram of clock 130. As shown in FIG. 5A, the DIGIN signal 127 is input via inverter 501 The output of inverter 501 comprises the TIC signal 135 and one input to NOR gate 502. The second input of NOR gate 502 is derived from the output of two input NOR gate 504. One input of the NOR gate 504 is the EOTR, or "end-of-transmission", signal 155. The other input of NOR gate 504 derives from the output of NOR gate 502, thus allowing NOR gates 502 and 504 to function as a single digit latch cell in a manner well known in the art. The output of NOR gate 502 is also connected to one input of NAND gate 506. Second input of NAND gate 506 is the EOTR signal 155 connected via inverter 503. The output of NAND gate 506 is connected in parallel to the reset inputs of D-type edge triggered flip-flops 520, 522, 524, 526, and 528. The output of NAND gate 506 is also connected via inverter 505 to the enable input of oscillator 550. The second input of oscillator 550 is connected to the CLKIN signal 131. The output of oscillator 550 is connected to the "C" (clock) input of D flip-flop 520. The output of oscillator 550 is also connected via inverter 507 to the /C input of D flip-flop 509.

Each "D" data inputs of the respective flip-flops 520–528 used in clock 530 is connected to said flip-flop's respective /Q output. That is, the data input of flip-flop 520 is connected to the /Q output of flip-flop 520. Likewise the D inputs of flip-flops 522, 524, 526, and 528 are connected to the /Q outputs of flip-flops 522, 524, 526, and 528 respectively. The /C inputs of flip-flops 522, 524, 526, and 528 are connected to the preceding flip-flops Q output. For example, the Q output of flip-flop 520 is connected to the /C input of flip-flop 522. Coupling of the flip-flops 520–528 in this manner allows them to function as an asynchronous counter in a manner well known in the art.

The Q outputs of each respective flip-flop 520–528 and the /Q output of flip-flop 520 form the input to 5 input NOR gate 508. The output of NOR gate 508 is connected via inverter 520 to comprise the TIMESUP signal 133. The /Q output of flip-flop 528 is also connected via inverter 511 to comprise the CLK01 signal 137.

Operation of clock 530 described with reference to FIG. 5A is hereinafter described. The first occurrence of a high signal on the input of DIGIN signal 127 via inverter 501 will cause the latch circuit comprising NOR gates 502 and 504 to release the resets to the flip-flops through gate 506. A high input on the DIGIN signal 127 sets the output of NOR gate 502 high into NAND gate 506 output there by releasing the resets on the flip-flops. A high EOTR signal on the input of NOR gate 504, will result in the output of NAND gate 506 setting the resets of the counter to zero. The input of the DIGIN signal 127 is passed through NAND gate 506 and through inverter 505 to enable oscillator 550 to generate a stable output signal /DOUT for use in the discriminator system. As hereinafter described, oscillator 550 provides a stable time base signal to the clock counter which is relatively independent of process variations, input voltage and temperature.

As each cycle of the oscillator output 550 is fed to the C input of flip-flop 520, a count is registered and the state of the flop-flop 520 changes. When the output /Q of flip-flop 520 changes states generating a rising signal, a change in state of the Q and /Q outputs of flip-flop 522 occurs. Likewise each of the /Q output of flip-flops 522, 524 and 526 will change the states of flip-flops 524, 526 and 528, respectively. Counting of the oscillator signal proceeds in this manner for 620 $\mu$s. At this point the Q outputs of flip-flops 522, 524, 526 and 528 and output /Q of flip-flop 520 are combined to drive the output of NOR gate 508 high. The output NOR 508 is thereafter inverted by inverter 520 comprising the TIMESUP signal 654. The low TIMESUP signal 654 is then used to reset the threshold counter 610 and the space latch.

Additionally, the CLK01 signal 137 is generated by the /Q output of flip-flop 528 via inverter 511 when the output of /Q goes low. Thus, the TIMESUP signal 133 lags the CLK01 signal 137 by 20 $\mu$s. This is necessary to allow for changes in the device logic to flow through the system due to the slower switching times of the logic devices operating at the 1 volt range of the device.

FIG. 5B is a schematic diagram of the clock oscillator 550 used in the preferred embodiment of clock 530. An ENABLE 152 input voltage is connected to the gates of transistors 551 and 553, and via inverter 562 to the gate of transistor 555 enabling the oscillator input voltage $V_{dd}$. The ENABLE signal 552 is also coupled to one input of NOR gate 564 which drives oscillator input inverter 566. The drain of transistor 551 is coupled via resistor 561 to the non-inverting input of a comparator 560 formed by a differential pair of zero threshold devices, 571 and 573 and current mirror load transistors 575 and 577. The inverting input of comparator 560 is connected to an RC timing circuit comprised of a MOS timing capacitor 591 and thin film resistor 563. The output of the comparator means 560 is comprised of transistor 579. The drain of transistor 581 is coupled to the drain of transistor 579 and to the second input of NOR 564.

In operation, the oscillator is activated by a low input on the ENABLE signal 552, allowing $V_{dd}$ to pass to the reference input of the comparator at the gate of transistor 571. Initially, the input of inverter 566 is forced to the negative rail by the output of NOR 564. The top plate of capacitor 591 charges to the positive rail $V_{dd}$ voltage via resistor 563. When the comparator 560 threshold of $\frac{1}{2}$ $V_{dd}$ is attained, the comparator 560 changes states, thereby charging the diffusion plate of capacitor 591 at the output of inverter 566 to charge to the negative voltage $V_{ss}$. The comparator 560 continues oscillation in this manner generating an alternating stable signal on the /DOUT and DOUT via inverter 568.

FIG. 6 is a schematic diagram of the threshold counter 610 used in the preferred embodiment of the invention.

The TIC signal 135 output from clock 130 is input to a two input NAND gate 602. The second input to NAND 602 is a function of the Q outputs of the first 3 flip-flops of the threshold counter 140. The TIMESUP signal 133 is connected in parallel to each of the reset inputs of the flip-flops used in the threshold counter 140. The output of NAND gate 602 is connected to the clock input of the first flip-flop 620 used in the counters. The output of NAND gate 602 is also connected via inverter 704 to the /C input of flip-flop 620. The data inputs of flip-flops 620, 622, 624, and 626 are all connected to the /Q outputs of each of the respective flip-flops 620–626. The Q outputs of flip-flops 620, 622 and 624 are connected to the respective /C inputs of flip-flops 622, 624, and 626. The /Q outputs of flip-flops 620, 622 and 624 comprise the inputs of three input NOR gate 606. The output of NOR gate 606 is connected via inverter 608 to one input of the two input NAND gate 602 hereinbefore described. The output of inverter 608 is also connected to inverter 610. The output of inverter 610 comprises the MARK signal 157 which is output to the null and mark counters.

Operation of threshold counter 140 described with reference to FIG. 6 is hereinafter described.

The purpose of the threshold counter 140 is to keep a running total of the number of threshold transitions coming from the comparator 112 output during the current 640 μs time unit. The TIC output 135 from the clock 130, is input to NAND gate 602 which allows the signal to pass until such time as the input from inverter 608 goes high. The input from inverter 608 will only go high when 7 input signals on the TIC signal 135 input are counted during the 640 μs time period. A count of 7 TIC signals 135 will cut off any further input from the TIC signal 135 to the threshold counter 140. Each positive output of NAND gate 602 acts on C input of flip-flop 620 to change the state of the Q and /Q outputs of flip-flop 620. As the Q and /Q outputs of the flip-flop 620 change states, the states of flip-flops 622, 624 and 626 will also change states in a cascading fashion. Each transition wherein the output of the /Q output of a preceding latch cell changes from low to high will cause the next succeeding latch cell to change states on its Q and /Q outputs.

When 7 signal inputs of the TIC signal 135 are received, the /Q outputs of latch cells 622, 624 and 626 will cause the output of NOR gate 606 to be high. This output will be inverted by inverter 608 sending a low signal to NAND gate 602 thereby disabling input to the counter. The low output of inverter 608 will also be inverted by inverter 610 to generate the MARK signal 141 which will input to the null and mark counters as described above.

FIG. 7 is a schematic diagram of the null counter 150 used in the preferred embodiment of the invention.

The CLK01 output 137 from threshold counter 140 is connected via inverter 702 to the C input of the first flip-flop used in the null counter 150. The input is also fed directly into the /C output of the first latch cell 720. The MARK signal 157 from threshold counter 140 is one input to the two input NOR gate 704. The second input to the NOR gate 704 is the POR signal 139 discussed above with reference to FIG. 3B. The output of NOR gate 704 is connected in parallel to the resets of the five cells used in the counter. The counter itself is comprised of 10 flip-flops consecutively numbered 720, 722, 724, 726, 728, 730, 732, 734, 736, and 738. The data input to each latch cell 720–738 is connected to each /Q output.

The Q output of the first flip-flop 720 comprises the BC1 151 signal output to the mark counter 160. The /Q output of flip-flop 722 which is the BC2 160 signal, is also connected to the mark counter 160.

Each respective Q output of each 720–738 is connected to the /C input of the next respective flip-flop. For example, the Q output of flip-flop 720 is connected to the /C input of flip-flop 722. The Q output of flip-flop 722; is connected to the /C input of flip-flop 724. The Q output of latch cell 738 is unconnected. The /Q output of flip-flop 728 is connected via inverter 706 and inverter 710 to become the end of transmission, or /EOTR, signal 155.

As described above, the MARK signal 141, input to NOR gate 704 operates to drive each input of the flip-flops 720–738 thereby resetting the count in null counter 710 to 0. When the inputs for the POR signal 139 and the MARK signal 141 are both low, the output of NOR gate 704 will be high thus enabling the null counter 150. The CLK01 signal 137 via inverter 702 is input to the C input of the first flip-flop 720. The CLK01 signal 137 is also input to the /C input of latch cell 720. Operation of the flip-flops in the null counter 150 is similar to that as described with reference to the flip-flops used in the threshold counter 140 in that the outputs of each flip-flop are wired to form a cascade counter. The /Q output of flip-flop 728 via inverter 706 and inverter 710 becomes "end of transmission" (EOT) signal 155 at a count of 16 nulls in the null counter 150.

FIG. 8 is a schematic diagram of the mark counter 160 used in the preferred embodiment of the invention.

The MARK signal 141 is input to a two input NAND gate 808. The second input of the two input NAND gate 808 is the output of 5 input NOR gate 826. The TIMESUP signal 133 is connected via inverter 801 becomes one input of two input NOR gate 806. The outputs of NOR gates 804 and 806 are coupled to one input of the respective gate 806 and 804 allowing gates 804 and 806 to form a single cell latch which holds the space count, i.e. two consecutive nulls. The output of NAND gate 808 is input to one input of NAND gate 814. The mark counter 160 is a five bit counter comprised of 5 separate D type flip-flops numbered 830–838, respectively. The output of NAND gate 814 is connected in parallel to each of the clock inputs of the respective flip-flops 830–838. The output of NAND gate 814 is also connected via inverter 818 to the /C inputs of the respective flip-flops 830–838. The Q outputs of flip-flops 830, 832, 834 and 836 are connected to the D inputs of flip-flops 832, 834, 836 and 838 respectively. The Q outputs of flip-flops 830–838 are all connected to a 5 input NAND gate 826. The Q output of flip-flops 832–836 are also connected to a 3 input NOR gate 822. The output of NOR gate 822 is connected to one input of a 3 input NOR gate 802. The output of NOR gate 822 is also connected to one input of a 2 input NOR gate 820. The output of NAND gate 826 is also connected via inverter 824 to signal the ONE output. The output of NAND gate 826 is also connected to one input of NAND gate 236 as hereinbefore described. The other two inputs of the 3 input NAND gate 802 are comprised of the BC1 151 and BC1 153 signal 161s output from the null counter 150. The output of NOR gate 802 is connected to one input of the NOR gate 804.

NOR gates 804 and 806 form a single cell latch by connecting the output of NOR gate 804 to one input of the NOR gate 806 and the output of NOR gate 806 to one input of NOR gate 804. The output of NOR gate 804 is connected to the remaining input of the NOR gate 820. The output of NOR gate 820 becomes the DCK ("data clock") signal 161.

The output of NOR gate 804 is also connected to one input of a two input NAND gate 810. The output of NOR gate 804 is also inverted by inverters 811 and 813.

The output of inverter 813 is the second input on the two input NAND gate 810. Inverters 811 and 813 are loaded with capacitors 805 and 807. Together, these comprise a negative edge triggered one-shot, well known in the art. The output of NAND gate 810 is connected to one input of the two input NAND gate 814. The output of NAND gate 810 is also connected to inverter 816. The output of inverter 816 is connected in parallel to the reset inputs of the flip-flops 830-838. The output of inverter 816 is also the CLRMARK signal 673. The output of NAND gate 814, whose inputs are the MARK signal 157 and the space latch is input to the clock signal of the first flip-flop 830. The output of 814 is also connected to inverter 818 in parallel to the /C (not clock) inputs of each of the flip-flops 830-838.

Operation of the mark counter 160 described with reference to FIG. 8 is hereinafter described. Flip-flops 830-838 are connected to form a shift register-type counter as described above. On the input of the MARK signal through NAND 808 and 814, the data input to flip-flop 830 is clocked and flip-flop 830 changes states, thereby registering the data input signal via the D input in flip-flop 830. In accordance with well known principles, each MARK signal 141 causes the data stored in a preceding flip-flop to be shifted to the next succeeding cell. When a count of five marks is attained, the Q outputs of flip-flops 830-838 drive the output of NAND gate 826 LOW disabling the input of data through NAND gate 808. In addition, the ONE signal 163 is output via inverter 824 to the data registers used in the preferred application of the invention.

When the minimum number of marks necessary for a valid data bit is recorded in the mark counter 160, the Q outputs of flip-flops 832, 834 and 836 drive NOR 822 LOW to enable gate 802 to pass signals BC1 151 and BC1 153 through the the space latch. NOR gates 804 and 806 comprise a single cell latch whose output is driven by BC1 151 and BC1 153 when a count of two consecutive nulls defining a space is recorded by the null counter 611. When two consecutive nulls are recorded, signals BC1 151 and BC1 153 enable NOR 804 to reset the counter on the reset inputs to flip-flops 830-838, the CLRMARK signal 673 signal.

It is understood that although the preferred embodiments of the present invention have been illustrated and described above, alternatives and equivalents thereof will become apparent to those skilled in the art and, accordingly, the scope of the present invention should be defined only by the appended claims and equivalents thereof.

What is claimed is:

1. A method for discriminating the data signal of a transmitter means wherein binary encoded data is transmitted between said transmitter means and a receiver means in an amplitude modulated signal, said signal being an AC carrier varying about a first threshold level, comprising:
   determining the number of threshold crossings of the carrier during each of a number of discrete successive time intervals;
   characterizing those of said time intervals wherein the number of threshold crossings equals or exceeds a first predetermined number as a mark, and those of said time intervals wherein the number of threshold crossings does not exceed said first predetermined number as a null;
   counting the number of successive marks, wherein said successive marks are not separated by a predetermined number of nulls;
   characterizing a series of successive marks in excess of a second predetermined number as a one, and a series of successive marks in a range below said second predetermined number as a zero;
   whereby said signal transmitted by said transmitter means is discriminated from interference by spurious signals.

2. The method of claim 1 further including the steps of:
   detecting the peak signal amplitude of said AC carrier signal;
   characterizing a second threshold level, wherein said second threshold level is characterized between said first threshold level and said peak signal amplitude; and
   enabling said discrimination method only on those cycles of the carrier wherein the peak amplitude of said cycle exceeds said second threshold level.

3. The method of claim 2 wherein said second threshold level is characterized at about one-half the peak signal amplitude.

4. The method of claim 1 wherein said discrete time interval is 640 μs.

5. The method of claim 1 wherein said predetermined number of nulls equals two.

6. The method of claim 1 wherein said binary encoded data is transmitted by means of a ceramic bimorph transducer.

7. The method of claim 6 wherein changes in temperature and operating conditions in the transducer are compensated for by using the natural resonance of said transducer to vary the amount of driving current.

8. The method of claim 6 wherein said transducer means is driven to generate said AC carrier signal by driving means, said driving means including a control means for enabling said driving means to oscillate in response to an alternating feedback input to said control means.

9. The method of claim 8 wherein said control means includes a digital logic gate.

10. The method of claim 1 wherein said carrier signal is an ultrasonic signal.

11. The method of claim 10 wherein the frequency of said carrier signal is about 25 khz.

12. The method of claim 1 wherein the modulation length of said carrier signal characterized as a "1" is about two times the modulation length of said carrier signal characterized as a "0".

13. The method of claim 1 wherein said number of successive marks is determined by counting the number of negative going threshold crossings of said carrier during each of a number of discrete successive time intervals.

14. The method of claim 13 wherein said negative going threshold crossings are determined by comparing a received signal to a slowly varying voltage waveform input, generating a square wave output therefrom, and counting said square wave output.

15. The method of claim 14 wherein a mark is characterized when the number of negative threshold crossings counted during said discrete successive time interval reaches a third predetermined value.

16. The method of claim 14 wherein a null is characterized when the number of negative threshold crossings counted during said discrete successive time interval does not reach a third predetermined value.

17. The method of claim 16 wherein said third predetermined value equals seven.

18. The method of claim 1 wherein a data input of one is characterized when said second predetermined number equals or exceeds five.

19. The method of claim 1 wherein a zero is characterized when the range below said second predetermined number is equal to or greater than two, but less than or equal to four.

20. The method of claim 1 wherein the number of successive nulls is counted.

21. The method of claim 20 wherein a count of two successive nulls is characterized as a space.

22. The method of claim 21 wherein data inputs are characterized only when said data are separated by at least one space.

23. An apparatus for discriminating the data signal of a transmitter means wherein binary encoded data is transmitted between said transmitter means and a receiver means in an amplitude modulated signal, said signal being an AC carrier varying about a first threshold level, comprising:
means for determining the number of threshold crossings of the carrier during each of a number of discrete successive time intervals;
means for characterizing those of said time intervals wherein the number of threshold crossings equals or exceeds a first predetermined number as a mark, and those of said time intervals wherein the number of threshold crossings does not exceed said predetermined number as a null;
means for counting the number of successive marks, wherein said successive marks are not separated by a predetermined number of nulls;
means for characterizing a series of successive marks in excess of a second predetermined number as a one, and a series of successive marks in a range below said second predetermined number as a zero;
whereby said signal transmitted by said transmitter means is discriminated from interference with spurious signals.

24. The apparatus of claim 23, further including:
means for detecting the peak signal amplitude of said AC carrier signal;
means for characterizing a second threshold level, wherein said second threshold level is characterized between said first threshold level and said peak signal amplitude; and
means for enabling said discrimination method only on those cycles of the carrier wherein the peak amplitude of said cycle exceeds said second threshold level.

25. The apparatus of claim 23 wherein said transmitter means includes a ceramic bimorph transducer.

26. The apparatus of claim 25 wherein said transmitter means includes means for compensating for changes in temperature and operating conditions in said transducer by using the natural resonance of said transducer to vary the amount of driving current.

27. The apparatus of claim 25 wherein said transmission means further includes:
means for driving said transducer to generate said AC carrier signal, wherein said driving means includes control means for enabling said driving means to oscillate in response to an alternating feedback input to said control means.

28. The apparatus of claim 27 wherein said control means is a digital logic gate.

29. The apparatus of claim 23 wherein said discrete successive time interval is 640 $\mu$s.

30. The apparatus of claim 23 wherein said predetermined number of nulls is two.

31. The apparatus of claim 23 wherein said carrier signal is an ultrasonic signal.

32. The apparatus of claim 23 wherein the frequency of said carrier signal is 25 khz.

33. The apparatus of claim 23 wherein the modulation length of said carrier signal characterized as about two times the modulation length of said carrier signal characterized as a zero.

34. The apparatus of claim 23 wherein said means for determining said number of successive marks includes means for counting the number of negative going threshold crossings of the carrier during each of a number of discrete successive time intervals.

35. The apparatus of claim 34 including means for comparing a received signal to a slowly varying voltage waveform, means for generating a square wave output therefrom, and means for counting said square wave output.

36. The apparatus of claim 35 wherein said means for counting successive marks records a count when the value recorded in said threshold counter during said discrete successive time interval reaches a third predetermined number.

37. The apparatus of claim 36 including means for counting successive nulls.

38. The apparatus of claim 37 wherein said means for counting nulls records a count when the value recorded in said threshold counter during said discrete successive time interval does not reach a third predetermined value.

39. The apparatus of claim 23 including means for outputting a data signal of "1" when said mark counting means counts the number of successive marks as equal to or exceeding five.

40. The apparatus of claim 23 including means for outputting a data signal of zero when the mark counting means counts the number of successive marks in a range from that equal to or greater than two, but less than or equal to four.

41. The apparatus of claim 37 including means for characterizing a space when said means for counting successive nulls reaches said predetermined number of nulls.

42. The apparatus of claim 41 wherein said data input received is separated by one or more spaces.

* * * * *